US009512659B2

(12) United States Patent
Delport et al.

(10) Patent No.: US 9,512,659 B2
(45) Date of Patent: Dec. 6, 2016

(54) CODE HOPPING BASED SYSTEM WITH INCREASED SECURITY

(75) Inventors: Vivien Delport, Chandler, AZ (US); Michael A. Stuckey, Chandler, AZ (US); Enrique Aleman, Gilbert, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 967 days.

(21) Appl. No.: 13/610,377

(22) Filed: Sep. 11, 2012

(65) Prior Publication Data

US 2013/0064372 A1  Mar. 14, 2013

Related U.S. Application Data

(63) Continuation of application No. 13/477,766, filed on May 22, 2012, now Pat. No. 8,842,829, and a continuation of application No. 13/477,534, filed on May 22, 2012.

(60) Provisional application No. 61/533,590, filed on Sep. 12, 2011.

(51) Int. Cl.
*H04L 12/22* (2006.01)
*E05F 15/00* (2015.01)
*E05F 15/60* (2015.01)
(Continued)

(52) U.S. Cl.
CPC .............. *E05F 15/00* (2013.01); *E05F 15/60* (2015.01); *E05F 15/603* (2015.01); *E05F 15/684* (2015.01); *E05F 15/77* (2015.01); *E05Y 2201/656* (2013.01); *E05Y 2201/672* (2013.01); *E05Y 2900/106* (2013.01); *Y10T 16/379* (2015.01); *Y10T 29/49959* (2015.01)

(58) Field of Classification Search
None
See application file for complete search history.

(56) References Cited

U.S. PATENT DOCUMENTS

| 5,303,303 A | * | 4/1994 | White | H04L 29/06 |
|  |  |  |  | 713/160 |
| 6,049,289 A |  | 4/2000 | Waggamon et al. | 340/5.23 |

(Continued)

FOREIGN PATENT DOCUMENTS

| CN | 1752996 A | 3/2006 |  |
| CN | 1814974 A | 8/2006 | ............. E04B 49/00 |

(Continued)

OTHER PUBLICATIONS

Barker, William C., "Recommendation for the Triple Data Encryption Algorithm (TDEA) Block Cipher," Initial Public Draft, National Institute of Standards and Technology, Technology Administration, U.S. Department of Commerce, NIST Special Publication 800-67, Version 1.2, 39 pages, Mar. 8, 2004.

(Continued)

*Primary Examiner* — Venkat Perungavoor
(74) *Attorney, Agent, or Firm* — Slayden Grubert Beard PLLC

(57) ABSTRACT

An access system includes a transmitter and a receiver for exchange of secure data wherein the system uses an encryption and a decryption algorithm to exchange a secure data packet. The secure data packet may include an unencrypted data packet and an encrypted data packet. The encrypted data packet may include first data encrypted by the encryption algorithm, and data decrypted by the decryption algorithm, wherein the data decrypted by the decryption algorithm includes a combination of a secure signature and second data encrypted by the encryption algorithm.

25 Claims, 3 Drawing Sheets

(51) Int. Cl.
*E05F 15/684* (2015.01)
*E05F 15/77* (2015.01)
*E05F 15/603* (2015.01)
*G06F 11/08* (2006.01)
*G06F 21/64* (2013.01)

(56) References Cited

U.S. PATENT DOCUMENTS

| | | | | |
|---|---|---|---|---|
| 6,263,432 | B1* | 7/2001 | Sasmazel | G06F 21/335 |
| | | | | 713/100 |
| 6,760,439 | B1 | 7/2004 | Windirsch | 380/37 |
| 8,924,041 | B2 | 12/2014 | Liang et al. | 701/2 |
| 2004/0049688 | A1* | 3/2004 | Candelore | H04N 5/783 |
| | | | | 713/191 |
| 2010/0098252 | A1* | 4/2010 | Kanter | H04L 9/0852 |
| | | | | 380/256 |
| 2010/0286846 | A1 | 11/2010 | Liang et al. | 701/2 |
| 2011/0051514 | A1 | 3/2011 | Han et al. | 365/185.09 |
| 2011/0051614 | A1* | 3/2011 | Li | H04L 63/0245 |
| | | | | 370/252 |
| 2011/0064093 | A1* | 3/2011 | Mattson | H04L 47/10 |
| | | | | 370/474 |
| 2012/0051539 | A1* | 3/2012 | Kar | H04N 21/23476 |
| | | | | 380/200 |
| 2012/0093312 | A1* | 4/2012 | Gammel | H04L 9/0631 |
| | | | | 380/255 |

FOREIGN PATENT DOCUMENTS

| | | | | |
|---|---|---|---|---|
| CN | 101393658 A | 3/2009 | | |
| TW | M401590 U1 | 4/2011 | | B60R 25/00 |
| WO | 00/18060 A2 | 3/2000 | | 12/58 |

OTHER PUBLICATIONS

International Search Report, Application No. PCT/US2012/038995, Sep. 7, 2012.
International Search Report and Written Opinion, Application No. PCT/US2012/054728, 11 pages, Feb. 6, 2013.
Chinese Office Action, Application No. 201280048727.6, 5 pages, Oct. 9, 2015.
Taiwan Office Action, Application No. 101133388, 10 pages, May 10, 2016.
Chinese Office Action, Application No. 201280048727.6, 5 pages, Jul. 27, 2016.

* cited by examiner

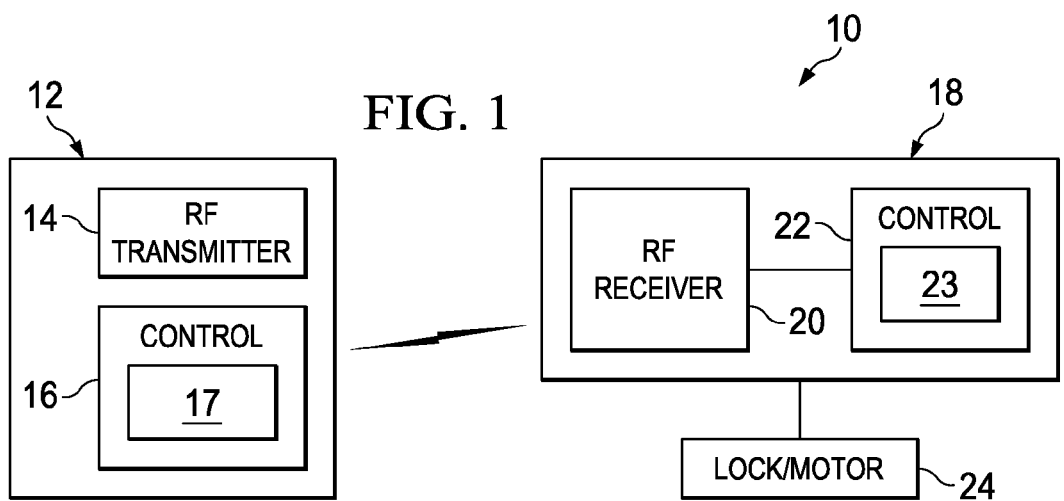
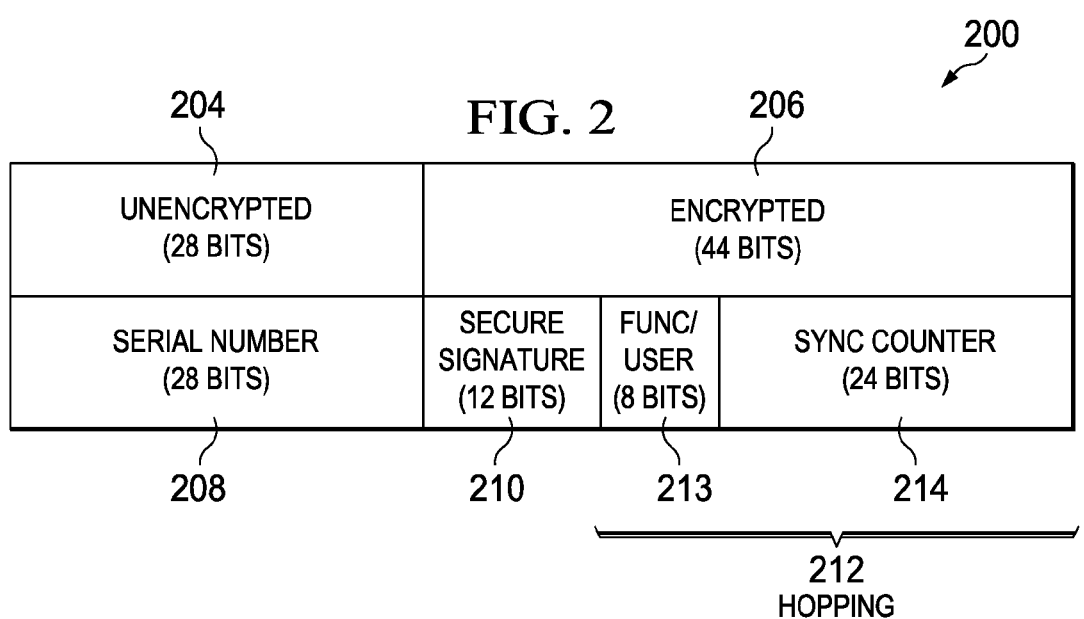

CODE HOPPING BASED SYSTEM WITH INCREASED SECURITY

CROSS REFERENCE TO RELATED APPLICATIONS

This application is a Continuation of both U.S. application Ser. No. 13/477,766 filed May 22, 2012 now U.S. Pat. No. 8,842,829 and U.S. application Ser. No. 13/477,534 filed May 22, 2012. This application also claims the benefit of U.S. Provisional Application Ser. No. 61/533,590 filed Sep. 12, 2011, all of which applications are hereby incorporated by reference in their entirety.

TECHNICAL FIELD

The present disclosure relates to code hopping systems with increased security.

DESCRIPTION OF THE RELATED ART

Keyless entry systems, such as those for garage door openers and keyless car locks, generally employ radio transmitters to send instructions to radio receivers, which then cause the door to be opened or closed (or locked and unlocked). Such systems typically employ a hopping code to prevent "replay" attacks, where an eavesdropper records the transmission and replays it at a later time to open or unlock the door.

A widely used code hopping system is KeeLoq, available from Microchip Technology, Inc. Traditional KeeLoq employs a nonlinear feedback shift register (NLFSR) and encrypts a 32-bit block with a 64-bit encryption key. Newer KeeLoq systems also use other popular encryption systems including those based on XTEA (extended tiny encryption algorithm) or AES-128 (advanced encryption standard). XTEA employs a 64-bit block cipher with a 128-bit key, while AES-128 uses a 128-bit block and a 128-bit key.

Increasing the security of a security system generally requires the use of stronger encryption algorithms, the use of longer encryption keys, multiple encryption keys/calculations, or a combination of these methods. For example, using more than one 64-bit encryption key within the same system means that any brute force type attack scheme needs to calculate more key combinations to attack the security of the system.

All block cipher algorithms, such as the ones used with KeeLoq, typically work on a fixed block sizes (32 bits for traditional KeeLoq encryption or 128 bits for KeeLoq systems using AES-128 encryption). So, for example, to jump or upgrade from one block cipher algorithm (NLFSR) to another (AES-128) requires a significant increase in the number of data bits needed. This can complicate existing RF (radiofrequency) designs, perhaps even require a system redesign or, in the alternative, accept a reduction the overall system performance.

Put another way, to increase security of wireless based access systems, alternative encryption algorithms that typically require more data bits to be transmitted may be used. However, using a larger encryption block requires transmission of more data bits. More bits typically means slower reaction times or an increase in bit rate of the data transmission. Both these require redesign of current RF designs which can be costly and time consuming

SUMMARY OF THE DISCLOSURE

A wireless access system according to some embodiments includes a transmitter and a receiver for exchange of secure data wherein the system uses an encryption and a decryption algorithm to exchange a secure data packet. The secure data packet may include an unencrypted data packet and an encrypted data packet. The encrypted data packet may include first data encrypted by the encryption algorithm, and data decrypted by the decryption algorithm, wherein the data decrypted by the decryption algorithm includes a combination of a secure signature and second data encrypted by the encryption algorithm.

A wireless access method according to some embodiments includes producing a coded transmission by generating an unencrypted data packet and generating an encrypted data packet. The encrypted data packet may include first data encrypted by the encryption algorithm, and data decrypted by the decryption algorithm, wherein the data decrypted by the decryption algorithm comprises a combination of a secure signature and second data encrypted by the encryption algorithm. Finally, the method may include transmitting the coded transmission to a receiving device.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 1 is a diagram illustrating an exemplary wireless entry system.

FIG. 2 is a diagram illustrating an exemplary encrypted codeword.

DETAILED DESCRIPTION

Figure 3:
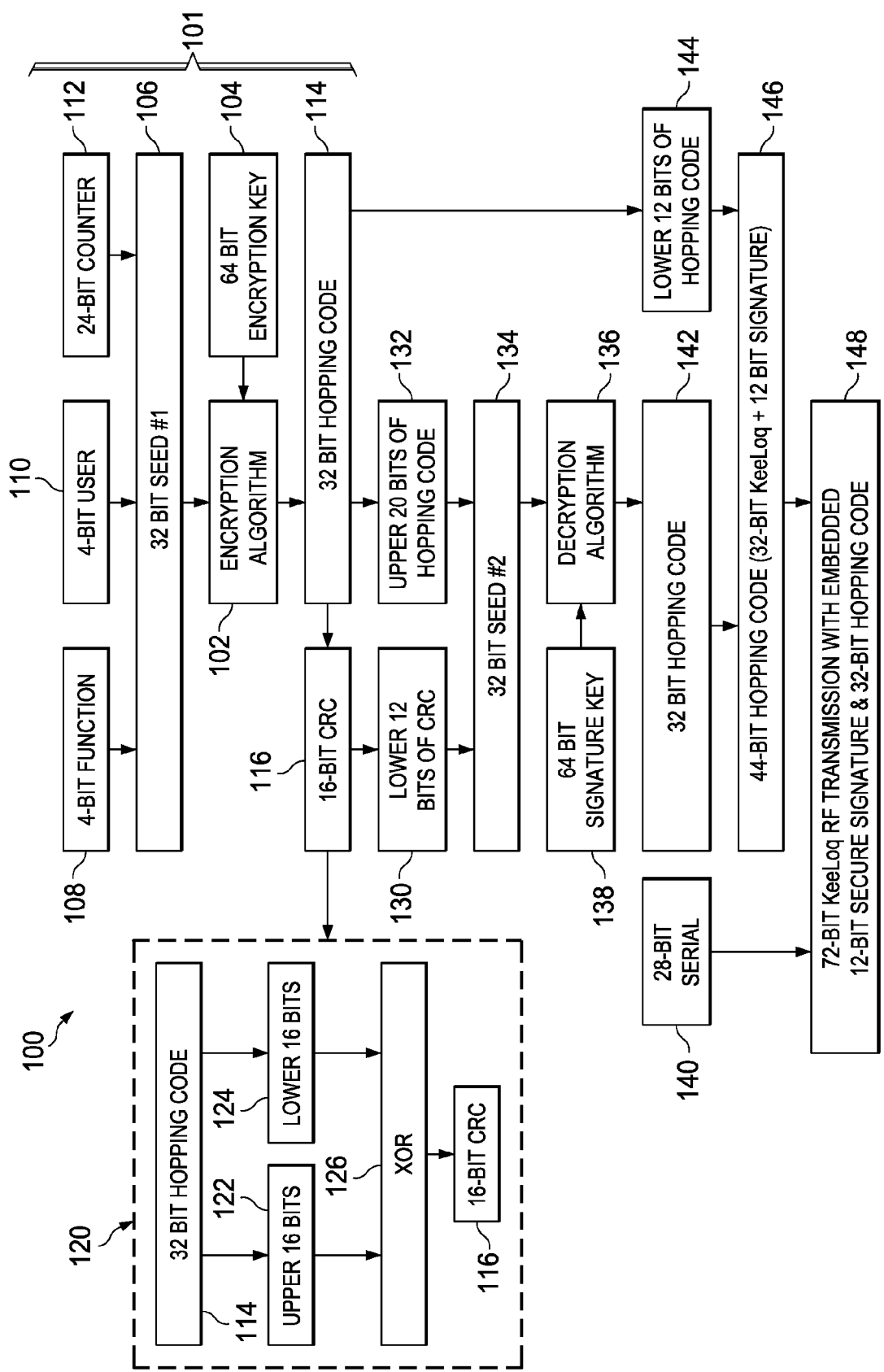
FIG. 3 is a diagram illustrating an exemplary method of calculating a codeword.

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Any suitable programming language can be used to implement the routines, methods or programs of embodiments of the invention described herein, including C, C++, Java, assembly language, etc. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer or other device to perform any of the steps, operations, methods, routines or portions thereof described herein. The invention may be implemented by using software programming or code in one or more computing devices, by using application specific integrated circuits (ASIC), programmable logic devices, field programmable gate arrays, and so on.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems.

According to various embodiments, secure signature bits are added into data transmissions, like RF code hopping transmissions, to verify the authenticity and originality of the transmitter or transceiver unit. Use of the secure signature bits in conjunction with a wireless access based code hopping transmission helps to increase the security of the data transmissions without switching to more complex algorithms, and the secondary problems involved with that, such as longer data transmission requirements.

According to various embodiments, a wireless control access code hopping system can use two independent encryption keys, a single symmetrical block cipher encryption, and CRC calculation to produce a secure digital signature while only increasing RF data packet size by less than 10%.

More particularly, to reduce the number of additional data bits needed for improving security, a system according to some embodiments utilizes a 16-bit CRC calculation, but then instead of simply sending the result unencrypted, the encoder obscures the result by using a decryption algorithm, such as a KeeLoq decryption algorithm, and a second 64-bit decryption key, called the Signature Key (SKEY). The intermingling of a 32-bit code hopping or rolling code with the 16-bit CRC value also helps to increase security, for now two 64-bit keys needs to be determined to allow the security system to work.

Turning now to the drawings and, with particular attention to FIG. 1, a diagram of an exemplary wireless entry system is shown and generally identified by the reference numeral 10. The wireless entry system 10 implements a wireless access system including a remote transmitter 12 and a base receiver 18.

In the embodiment illustrated, the remote transmitter 12 includes one or more radiofrequency (RF) transmitters or transceivers 14 and one or more controllers 16 implementing an encryption system according to various embodiments. The controller 16 may be implemented as any device or processor including or configured with an encryption control module 17. For example, the controller 16 may be implemented using a Microchip microcontroller running suitable software. Other controllers or processors may be used, however. In operation, the controller 16's encryption control module 17 encrypts control signals that are sent to the base receiver 18. The remote transmitter 12 may further be equipped with one or more user inputs for selecting, for example, one or more locking or unlocking functions.

The base receiver 18 may likewise include a receiver or transceiver 20 and a controller 22. The controller 22 may be implemented as any device or processor including or configured with a decryption control module 23. For example, the controller 22 may be implemented using a Microchip microcontroller running suitable software. Other controllers or processors may be used, however. In operation, the controller 22's decryption module 23 decrypts the signals from the remote transmitter 12.

The base receiver 18 may further be in communication with a device under control 24. Typically, the device is implemented as a lock, such as an automotive lock, or a motor, such as a motor for an automatic garage door. The device under control 24 receives control signals from the base receiver 18 including for example, instructions to open or close (or lock or unlock).

As will be described in greater detail below, embodiments provide a code hopping scheme that integrates a secure signature technique to increase system level security beyond a conventional code hopping system using the same security algorithm. The secure signature may be used in a wireless access system such as garage door openers or other keyless entry systems. The additional secure signature bits provide a way to increase the level security of the overall rolling code hopping code systems without switching to another more complicated encryption algorithm. In addition, the utilization of these additional secure signature data bits may add some level of protection against the unwanted cloning of transmitters by third parties.

FIG. 2 illustrates an exemplary codeword transmission in accordance with some embodiments. In the embodiment illustrated, the codeword transmission 200 includes an unencrypted portion 204 and an encrypted portion 206. In the embodiment illustrated, the codeword 200 is a codeword made up of 72 transmission bits. The fixed code, or unencrypted portion 204, contains a 28-bit device serial number 208. The encrypted portion 206 contains a combination of a 12-bit secure signature code 210, and the 32-bit hopping or rolling code 212, which is made up of a 24-bit synchronization counter 214, and a four bit function code and four bits of user-defined bits 213. In some embodiments, the code word 200 may include any or all of a counter, timer, or pseudo random value, a function value, or user defined bits.

Turning now to FIG. 3, a diagram illustrating exemplary wireless access processing 100 implemented by encryption control module according to embodiments is shown. It is noted that the processing 100 is illustrative of the transmission side; similar corresponding processing would be needed for the receive side.

As will be explained in greater detail below, the processing 100 includes code hopping and application of a signature key. In some embodiments, the code hopping is implemented as a hopping code portion 101 using a traditional 32-bit block cipher 102 that uses a 64-bit Encryption Key (EKEY) 104. In the embodiment illustrated, information contained within these first 32 bits is a seed 106 made up of a 24-bit synchronization counter 112, a 4-bit function code 108, and 4 user defined bits 110.

The 64-bit encryption key 104 (FIG. 3) used for each transmitter 12 (FIG. 1) is unique to that transmitter. The key 104 may be derived from a 64-bit manufacturer's code and the device's unique 28-bit serial number. This 64-bit manufacturer's code should be well protected and when possible changed regularly over time.

In the implementation illustrated, the number of bits for the synchronization counter 112 is 24 bits rather than 16 bits used in traditional KeeLoq systems, to increase the number of counter combinations from 65,536 to 16,777,216. This increase in the number of counter values helps prevent selective transmission capturing techniques. In some embodiments, transmitters may also be assigned a random starting counter value during production programming to better utilize the large counter space.

The 8 bit function/discrimination code may contain 4 bits of button information 108, as well as 4 customer configurable constant bits 110. These bits may be used during post decryption validation checks and also ultimately in identifying what button or function action is required. For example, the function could be opening or closing one or more locks. Particular locks may be assigned to individual buttons on a multi-button controller.

The resulting 32-bit hopping code 114 is then applied to generate a 16-bit CRC 116. For example, as shown at 120, the 32-bit hopping code 114 is separated into upper and lower 16 bit blocks 122, 124, respectively. The upper and lower blocks 122, 124 are then XORed 126 to produce the 16-bit CRC 116.

In some embodiments, the secure signature is derived from the 16-bit CRC 116. In particular, in some embodiments, the lower 12-bits of the 16-bit CRC 116 are used for the secure signature 130. The secure signature 130, along with the upper 20-bits 132 of the Hopping Code 114, are used as a second 32-bit seed 134. A different 64-bit key, called the Secure Signature Key (SKEY) 138, is used instead of the standard 64-bit device encryption key, and is applied to the decryption algorithm 136. The SKEY 138 can be the same for all devices or unique to each device—having them unique will add additional security to each transmitter. The SKEY 138 may be provided in any convenient way, such as by the manufacturer or the customer.

Advantageously, the steps for utilizing the additional 12-bit secure signature bits can be made very specific to particular manufacturer's transmitters. Anyone building transmitters that want to be code compatible with particular systems will need to follow the exact same calculations steps to work. Various algorithmic schemes can be used to generate these additional signature bits 130 ranging from a simple CRC checksum calculation to using more sophisticated secure hashing algorithms, such as SHA-1.

Returning to FIG. 3, the output of the decryption algorithm 136 is a second 32-bit hopping code 142. The 32-bit hopping code 142 (with the embedded secure signature) and the lower 12-bits 144 of the hopping code 114 are then applied to a 44-bit hopping code 146. Finally, the 28 bit serial number 140 is added to the 44-bit hopping code 146 to result in the transmission codeword 148, which includes the serial number 140, the secure signature 130, and the 32-bit hopping code 142.

Figure 4:
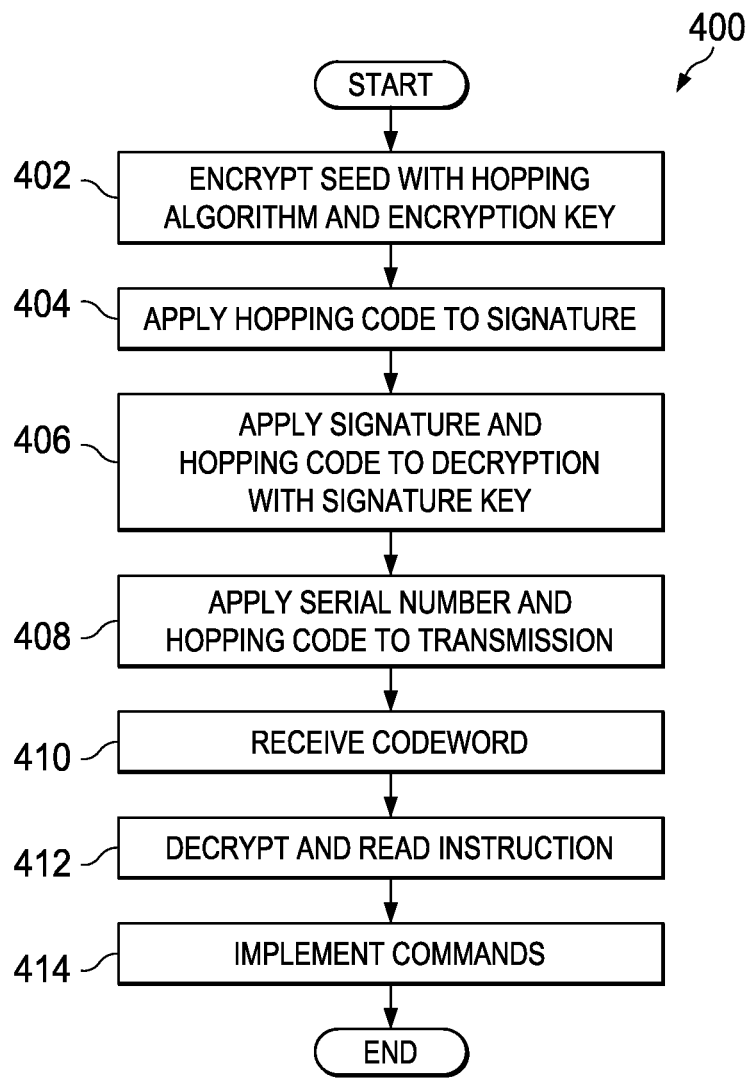
FIG. 4 is a flowchart illustrating operation of a wireless access system.

Turning now to FIG. 4, a flowchart 400 illustrating exemplary system operation according to a particular embodiment is shown. Initially, (step 402), a 32-bit seed is provided and encrypted using a hopping code and a first encryption key. As noted, above, the seed may include counter bits and user provided code or command bits corresponding to one or more commands or instructions. The encryption key may be provided, for example, by a manufacturer of the remote controller. The resulting first hopping code may then be provided for use as a cyclical redundancy checksum (CRC) (step 404) to derive a signature. In one embodiment, the secure signature is a 12-bit secure signature derived from a 16-bit CRC.

The secure signature and predetermined bits of the hopping code are then used with a second key (step 406) and decrypted using a decryption algorithm (corresponding to the encryption algorithm) and the second key, referred to as a signature key. The output of the decryption algorithm, predetermined encrypted bits, and a non-encrypted serial number are then applied to a transmission codeword (step 408). In some embodiments, the codeword may further include a predetermined number of bits from the first hopping code.

The resulting codeword is received at the base receiver (step 410), which decrypts the codeword (step 412). The command instructions are read by the base receiver and the base receiver implements the commands (step 414).

As noted above, some implementations of a secure access transmitter may employ a Microchip microcontroller. Other microcontrollers may be used, however. Further, it is noted that the encryption and decryption algorithms can be used in various permutations. Thus, the figure is exemplary only.

What is claimed is:

1. A wireless access system comprising:
a transmitter and a receiver for exchange of secure data wherein the system uses an encryption and a decryption algorithm to exchange a secure data packet, said secure data packet comprising:
an unencrypted data portion,
an encrypted data portion, wherein the encrypted data portion comprises:
a first data portion formed by a first data section of data encrypted by the encryption algorithm, wherein the first data section forms part of a hopping code, and
a second data portion comprising data decrypted by the decryption algorithm, wherein the data decrypted by the decryption algorithm comprises a combination of a secure signature derived from the hopping code and encrypted data formed by a second data section of the data encrypted by the encryption algorithm, wherein the secure signature is formed by CRC data calculated by a CRC algorithm applied to the data encrypted by the encryption algorithm, wherein the secure signature comprises a predefined number of bits from the CRC data.

2. The wireless access system according to claim 1, wherein the data encrypted by the encryption algorithm comprises a counter, timer, or pseudo random value, a function value, or user defined bits.

3. The wireless access system according to claim 1, wherein the encryption and decryption algorithms may be used in various permutations.

4. The wireless access system according to claim 1, wherein the unencrypted data portion is concatenated with the encrypted data portion.

5. An access system comprising:
a transmitter and a receiver for exchange of secure data wherein the system uses an encryption and a decryption algorithm, said secure data packet comprising:
an unencrypted data portion,
an encrypted data portion, wherein the encrypted data portion comprises:
a first data portion formed by a first data section of data encrypted by the encryption algorithm, wherein the first data section forms part of a hopping code, and
a second data portion comprising data decrypted by the decryption algorithm, wherein the data decrypted by the decryption algorithm comprises a combination of a secure signature derived from the hopping code and encrypted data formed by a second data section of the data encrypted by the encryption algorithm, wherein the secure signature is formed by CRC data calculated by a CRC algorithm applied to the first and second data section, wherein the secure signature comprises a predefined number of bits from the CRC data.

6. The access system according to claim 5, wherein data encrypted by the encryption algorithm comprises a counter, timer, or pseudo random value, a function value, or user defined bits.

7. The access system according to claim 5, wherein the encryption and decryption algorithms may be used in various permutations.

8. The access system according to claim 5, wherein the unencrypted data is concatenated with the encrypted data.

9. A wireless access device comprising:
a transmitter for transmitting encoded data to a receiver; and
a controller including a computer program product comprising one or more nontransitory machine readable media for implementing an encryption and a decryption algorithm, said secure data comprising:
an unencrypted data portion,
an encrypted data portion concatenated with the unencrypted data portion, wherein the encrypted data portion comprises:
a first data portion formed by a first data section of data encrypted by the encryption algorithm, wherein the first data section forms part of a hopping code, and
a second data portion comprising data decrypted by the decryption algorithm, wherein the data decrypted by the decryption algorithm comprises a combination of a secure signature derived from the hopping code and encrypted data formed by a second data section of the data encrypted by the encryption algorithm, wherein the secure signature is formed by CRC data calculated by a CRC algorithm applied to data derived from the first and second data section, wherein the secure signature comprises a predefined number of bits from the CRC data.

10. The wireless access device according to claim 9, wherein data encrypted by the encryption algorithm comprises a counter, timer, or pseudo random value, a function value, or user defined bits.

11. The wireless access device according to claim 9, wherein the encryption and decryption algorithms may be used in various permutations.

12. The wireless access device according to claim 10, wherein the data encrypted by encryption algorithm comprises a 24-bit counter value, a 4-bit user value and a 4-bit function value.

13. A wireless access method, comprising:
producing a coded transmission, the producing including:
generating an unencrypted data portion; and
generating an encrypted data portion, wherein the encrypted data packet comprises:
a first data portion formed by a first data section of data encrypted by an encryption algorithm, and
a second data portion comprising data decrypted by an decryption algorithm, wherein the data decrypted by the decryption algorithm comprises a combination of a secure signature derived from the data encrypted by the encryption algorithm and data formed by a second data section of the data encrypted by the encryption algorithm, wherein the secure signature is formed by CRC data calculated by a CRC algorithm applied to the data encrypted by the encryption algorithm, wherein the secure signature comprises a predefined number of bits from the CRC data; and
transmitting the coded transmission to a receiving device.

14. The wireless access method according to claim 13, wherein the data encrypted by the encryption algorithm comprises a counter, timer, or pseudo random value, a function value, or user defined bits.

15. The wireless access method according to claim 13, wherein the encryption and decryption algorithms may be used in various permutations.

16. The wireless access method according to claim 13, further comprising: concatenating the unencrypted data portion and the encrypted data portion.

17. A wireless access method in accordance with claim 13, further comprising decrypting the coded transmission at the receiving device and using the decrypted data to control a lock or motor.

18. The wireless access system according to claim 1, wherein the encryption algorithm uses an encryption key.

19. The wireless access system according to claim 18, wherein the encryption algorithm uses a signature key.

20. The wireless access system according to claim 19, wherein the encryption key is a 64-bit key, the signature key is a 64-bit key, the encryption algorithm generates a 32-bit code, wherein the first data section is 12 bits long and wherein the second data section is 32-bits long.

21. The wireless access system according to claim 1, wherein the CRC algorithm is separately applied to an upper data portion and a lower data portion of the data encrypted by the encryption algorithm and wherein the results of the CRC algorithm are XORed to form the secure signature.

22. The wireless access method according to claim 13, wherein the encryption algorithm uses an encryption key.

23. The wireless access method according to claim 22, wherein the encryption algorithm uses a signature key.

24. The wireless access method according to claim 23, wherein the encryption key is a 64-bit key, the signature key is a 64-bit key, the encryption algorithm generates a 32-bit code, wherein the first data section is 12 bits long and wherein the second data section is 32-bits long.

25. The wireless access method according to claim 13, wherein the CRC algorithm is separately applied to an upper data portion and a lower data portion of the data encrypted by the encryption algorithm and wherein the results of the CRC algorithm are XORed to form the secure signature.

* * * * *